United States Patent
Aldereguia et al.

(10) Patent No.: US 9,544,001 B1
(45) Date of Patent: Jan. 10, 2017

(54) SENDING AND RECEIVING MESSAGES USING TARGET CRITERIA OTHER THAN A NETWORK IDENTIFIER

(71) Applicant: Lenovo Enterprise Solutions (Singapore) Pte. Ltd., Singapore (SG)

(72) Inventors: Alfredo Aldereguia, Cary, NC (US); Alan Fontaine, Cary, NC (US); John Langgood, Cary, NC (US); Carol Machuca, Raleigh, NC (US); Joseph E. Maxwell, Cary, NC (US); James J. Parsonese, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/941,855

(22) Filed: Nov. 16, 2015

(51) Int. Cl.
```
G08G 1/00      (2006.01)
H04B 1/3822    (2015.01)
H04W 4/22      (2009.01)
B60Q 1/52      (2006.01)
H04H 20/59     (2008.01)
H04H 20/71     (2008.01)
```

(52) U.S. Cl.
CPC ............ *H04B 1/3822* (2013.01); *B60Q 1/52* (2013.01); *H04H 20/59* (2013.01); *H04H 20/71* (2013.01); *H04W 4/22* (2013.01)

(58) Field of Classification Search
CPC ........ B60R 25/04; B60R 25/24; B60R 25/102; B60R 25/33; G08G 1/096716; G08G 1/0967; G08G 1/096775; G08G 1/166
USPC .................... 340/426.11–426.16, 901–905
See application file for complete search history.

(56) References Cited

U.S. PATENT DOCUMENTS

| | | | | |
|---|---|---|---|---|
| 2005/0073432 A1* | 4/2005 | Melman | ............... | G08G 1/0965 340/902 |
| 2009/0316671 A1* | 12/2009 | Rolf | ............... | H04W 4/02 370/338 |
| 2013/0278440 A1* | 10/2013 | Rubin | ............... | G08G 9/02 340/903 |
| 2015/0381551 A1* | 12/2015 | Cai | ............... | H04L 67/12 709/206 |

* cited by examiner

*Primary Examiner* — Kerri McNally
*Assistant Examiner* — Sharmin Akhter
(74) *Attorney, Agent, or Firm* — Douglas Robinson; Jeffrey L. Streets (57) ABSTRACT

A system, method and a computer program product for performing the method are provided. The system includes a communication device installed in a vehicle, wherein the communication device is configured to receive a wireless network broadcast message including target criteria other than a network identifier, and output the broadcast message to a user if the communication device satisfies the target criteria. The method includes determining a current location of a first mobile communication device, and the first device sending a message containing target criteria associated with a target vehicle over a wireless data network, wherein the target criteria does not include a network identifier. The method further includes broadcasting the message containing the target criteria over a geographically-specific area including the current location of the first mobile communication device, wherein only a second mobile communication device satisfying the target criteria will receive and display the message.

13 Claims, 5 Drawing Sheets

| Police Car 12 | Local Telecom. Tower (LTT) 11 | Local Police Dispatcher (LPD) 15 | Alert Aggregator 17 | Wireless Data Network Operator 19 | Local Telecom. Tower 11 | Target Vehicle (TV) 14 |
|---|---|---|---|---|---|---|
| Mobile Device 20 | | | | | | Mobile Device 20 |
| | | | | | | (79) configure mobile device with license plate number (LPN) |
| (81) visually read license plate number (LPN) on Target Vehicle (TV) | | | | | | |
| (82) Call Local Police Dispatcher (LPD) and report LPN | (83) Provide Local Tele. Tower (LTT) with LPN or location | (84) Enter request for message to TV at LTT | (85) Forward request to Wireless Data Network Operator | (86) Send message to LTT with LPN | (87) Broadcast message with LPN | (88) Receive message only if LPN matches configuration. (89) Alert user of message |
| (92) Receive response and flash light in acknowledgement | | | | | (91) Forward response to Police Car Mobile Device | (90) Prompt user to authorize TV lights to flash and send response to Police Car Mobile Device |

SENDING AND RECEIVING MESSAGES USING TARGET CRITERIA OTHER THAN A NETWORK IDENTIFIER

BACKGROUND

Field of the Invention

The present invention relates to sending a message to a mobile communication device, or the mobile communication device receiving a message, over a wireless data network without using a network address associated with the mobile communication device.

Background of the Related Art

Mobile communication devices, such as smart phones, tablet computers and certain vehicle computer systems, enable useful communications over a wireless data network, such as a cellular telecommunications system. These mobile communication devices may communicate over the wireless data network using various types of communication formats, such as text messages, voice calls, or audio/video conferencing.

Each mobile communication device has a unique network address, such as a telephone number or a subscriber identity. Typically, a user will share the telephone number with another user in order to allow communications between the users' mobile communication devices. However, in order to contact a mobile communication device belonging to a particular person, you must have their telephone number.

BRIEF SUMMARY

One embodiment of the present invention provides a system, comprising a communication device installed in a vehicle, wherein the communication device is configured to receive a wireless network broadcast message including target criteria other than a network identifier, and output the broadcast message to a user if the communication device satisfies the target criteria in the broadcast message.

Another embodiment of the present invention provides a method, comprising determining a current location of a first mobile communication device, and the first mobile communication device sending a message containing target criteria associated with a target vehicle over a wireless data network, wherein the target criteria does not include a network identifier for the second mobile communication device. The method further comprises the wireless data network broadcasting the message containing the target criteria over a geographically-specific area including the current location of the first mobile communication device, and only a second mobile communication device satisfying the target criteria receiving and displaying the message.

Yet another embodiment of the present invention provides a computer program product comprising program instructions embodied on a non-transitory computer readable storage medium, wherein the program instructions are executable by a processor to cause the processor to perform a method. The method comprises determining a current location of a first mobile communication device, and the first mobile communication device sending a message containing target criteria associated with a target vehicle over a wireless data network, wherein the target criteria does not include a network identifier for the second mobile communication device. The method further comprises the wireless data network broadcasting the message containing the target criteria over a geographically-specific area including the current location of the first mobile communication device, and only a second mobile communication device satisfying the target criteria receiving and displaying the message.

DETAILED DESCRIPTION

One embodiment of the present invention provides a system, comprising a communication device installed in a vehicle, wherein the communication device is configured to receive a wireless network broadcast message including target criteria other than a network identifier, and output the broadcast message to a user if the communication device satisfies the target criteria in the broadcast message. The communication device preferably, but without limitation, outputs the broadcast message to an output device selected from a display, speaker, and a combination thereof.

In one option of the system, the target criteria is a vehicle identifier that is uniquely associated with the target vehicle and the communication device has been previously configured to store the vehicle identifier. Accordingly, the communication device satisfies the target criteria and displays the broadcast message in response to determining that the vehicle identifier in the broadcast message matches the vehicle identifier stored by the communication device. For example, the vehicle identifier may be a license plate number or a vehicle identification number.

In another option of the system, the target criteria includes a target location, wherein the communication device satisfies the target criteria and outputs the broadcast message in response to determining that the communication device is located within a predetermined distance of the target location. Alternatively, the target criteria includes a target location and a speed value, and wherein the communication device satisfies the target criteria and outputs the broadcast message in response to determining that the communication device is located within a predetermined distance of the target location and that the communication device is moving at a speed within a predetermined amount of the speed value.

Another embodiment of the present invention provides a method, comprising determining a current location of a first mobile communication device, and the first mobile communication device sending a message containing target criteria associated with a target vehicle over a wireless data network, wherein the target criteria does not include a network identifier for the second mobile communication device. The method further comprises the wireless data network broadcasting the message containing the target criteria over a geographically-specific area including the current location of the first mobile communication device, and only a second mobile communication device satisfying the target criteria receiving and displaying the message.

The current location of the first mobile communication device may be determined in various manners. In one option, the first mobile communication device may determine its own current location, such as by using a global positioning system signal that enables the current location to be stated as geographic coordinates. In various embodiments, the first mobile communication device may then transmit the current location to a communication network. In an alternative option, the wireless data network may determine the current location of the first mobile communication device by identifying the geographic area in which a telecommunication tower is currently receiving a signal from the first mobile communication device. For example, embodiments of the method may include a telecommunication tower in the wireless data network receiving the message from the first mobile communication device, wherein the geographically-specific area is the broadcast area of the telecommunication tower.

In one embodiment, the target criteria is a license plate identifier that is uniquely associated with the target vehicle, wherein the second mobile communication device has been configured to store the license plate identifier. The second mobile communication device satisfies the target criteria and displays the message in response to determining that the license plate identifier in the broadcast message matches the license plate identifier stored by the second mobile communication device. In one non-limiting example, a first user of the first mobile communication device may visually observe the target vehicle and read the license plate identifier from a license plate that is physically secured to the target vehicle. Accordingly, the first user may input the license plate identifier into the first mobile communication and cause the message to contain the license plate identifier when the message is sent over the wireless data network. In an alternative example, the license plate identifier or a vehicle identification number (VIN) may be obtained through short range wireless communication with the target vehicle or the second mobile communication device. For the purposes of the present invention, the license plate identifier and the VIN may be considered alternative target criteria. A government motor vehicle database may provide a cross-reference between a license plate identifier and an associated VIN.

The license plate identifier that is uniquely associated with the target vehicle may be printed on an outwardly visible surface of a license plate secured to the target vehicle. The laws of many states and countries allow for the issuance of license plates printed with unique identifiers and require that the license plate be visible on the vehicle for which the unique identifier is issued and associated. Accordingly, the license plate identifier is visible to a user of the first mobile communication device, such as if the user is behind the target vehicle.

In another embodiment, the target criteria includes a current location and a speed value. The second mobile communication device satisfies the target criteria and displays the message in response to determining that the second mobile communication device is within a predetermined proximity to the current location and has a speed within a predetermined amount of the speed value. In one non-limiting example, the first mobile communication device may identify its current location and speed value, and include the current location and speed and cause the message to contain the current location and speed value when the message is sent over the wireless data network. In this example, the location and speed of the first mobile communication device is provided as the target criteria serving as an approximation of the location and speed of the second mobile communication device. This approximation is quite accurate in the situation where the first mobile communication device is in a vehicle that is following the target vehicle with the second mobile communication device inside. Accordingly, the second mobile communication device determines its own location and speed, and if the location and speed are within a predetermined amount of the location and speed contained in the message, then the second mobile communication device will display the message. In an alternative example, the location and/or speed of the target vehicle may be measured using a radar device and provided to the first mobile communication device for inclusion in the message as target criteria.

Both the first mobile communication device and the second communication device need access to a wireless data network, such as a local, regional, national or global telecommunications network. Preferably, the first and second communication devices will have access to the same wireless data network, although the devices could access different wireless data networks that are interconnected. In certain embodiments, the first mobile communication device may be authorized or privileged to send messages that, rather than being forwarded to a destination device specified in the message by a network identifier, will be broadcast over a geographically-specific area that includes the first mobile communication device. While every mobile communication device within the geographically-specific area may monitor the broadcasted messages, only the mobile communication device that satisfies the target criteria will receive the entire message and display the message for viewing by a user. For example, the second mobile communication device may display the message as a text message or a notification, such as an emergency notification.

In one embodiment of the method, the message may be sent through a wireless emergency alert system that uses the wireless data network for broadcasting messages to an unrestricted number of mobile communication devices. In one option, the wireless data network broadcasts the message only if the message is received from a device authorized by the wireless data network, and the first mobile communication device sends the message along with authorization data. In another option, a control center receives the message from the first mobile communication device and forwards the message to the wireless data network along with authorization data.

In one specific implementation, the first mobile communication device is installed in an emergency vehicle, such as a police car, and the second mobile communication device is located within the target vehicle that secures a license plate that displays the license plate identifier. Beneficially, a user of the first mobile communication device in the police car may detect that the target vehicle has violated a traffic law and read the license plate identifier from the target vehicle's license plate. The license plate identifier may then be entered into the first mobile communication device and transmitted in the message to the wireless data network. When the wireless data network broadcasts the message, the second mobile communication device, which has been configured to store the license plate identifier, will be able to receive and display the message. In the example of a police car following a target vehicle, the message may be a request to stop the target vehicle.

In another embodiment, such as where the first mobile communication device is installed in an emergency vehicle, the second mobile communication device may automatically cause the target vehicle to flash external lights in a predetermined pattern in response to receiving the message. For example, the second mobile communication device may transmit an instruction to the target vehicle via a point-topoint wireless communication, such as using the BLUETOOTH standard. (Bluetooth is a trademark of the Bluetooth Special Interest Group). The act of flashing the external lights of the target vehicle in a predetermined pattern signals to the emergency vehicle that the second mobile communication device has in fact received the message.

In a further embodiment, such as in furtherance of the foregoing embodiment where the first mobile communication device is installed in an emergency vehicle, the message displayed to the second mobile communication device may include a wireless address, such as a telephone number, enabling the second mobile communication device to send a reply message to the first mobile communication device. The second mobile communication device may, therefore, send a reply message to the first mobile communication, wherein the reply message includes a request to cause the emergency vehicle to flash lights in a predetermined pattern. Preferably, the first mobile communication device may then automatically cause the emergency vehicle to flash lights in a predetermined pattern in response to receiving the reply message. The act of flashing the external lights of the emergency vehicle in a predetermined pattern signals to the driver of the target vehicle that the emergency vehicle has in fact received the message and that the emergency vehicle is a legitimate emergency vehicle.

In yet another embodiment of the present invention provides a computer program product comprising program instructions embodied on a non-transitory computer readable storage medium, wherein the program instructions are executable by a processor to cause the processor to perform a method. The method comprises determining a current location of a first mobile communication device, and the first mobile communication device sending a message containing target criteria associated with a target vehicle over a wireless data network, wherein the target criteria does not include a network identifier for the second mobile communication device. The method further comprises the wireless data network broadcasting the message containing the target criteria over a geographically-specific area including the current location of the first mobile communication device, and only a second mobile communication device satisfying the target criteria receiving and displaying the message.

This method can use a specific adaptation of the Federal WEA (Wireless Emergency Alerts) system. WEA is an existing public safety system that allows customers to receive geographically-targeted, text-like messages alerting them of imminent threats to safety in their area. Pre-authorized national, state or local government may send emergency alerts regarding public safety emergencies. Alerts from authenticated public safety officials are sent through FEMA's IPAWS to participating wireless carriers. Participating wireless carriers push the alerts from telecommunication towers to mobile devices in the affected area. The alerts appear like text messages on mobile devices.

The Federal WEA system, or a system with similar function, is enhanced to allow the geographically-targeted system to be device specific. Accordingly, users or owners of a mobile communication device may configure their device to filter received alerts and only display those messages that contain target criteria that is satisfied by the mobile communication device (i.e., a message containing a license plate identifier matching the license plate identifier stored by the mobile communication device). For example, messages carrying a license plate identifier would only be received and displayed by a mobile communication device having a filter enabled and configured to store the matching license plate identifier. Messages that are broadcast without a license plate identifier may still be received by all mobile communication devices in the target geographical area. With this capability, an authorized agency, such as a police department, can send a specific emergency alert to a specific device without having a network address for the device.

The foregoing computer program products may further include computer readable program code for implementing or initiating any one or more aspects of the methods described herein. Accordingly, a separate description of the methods will not be duplicated in the context of a computer program product.

Figure 1:
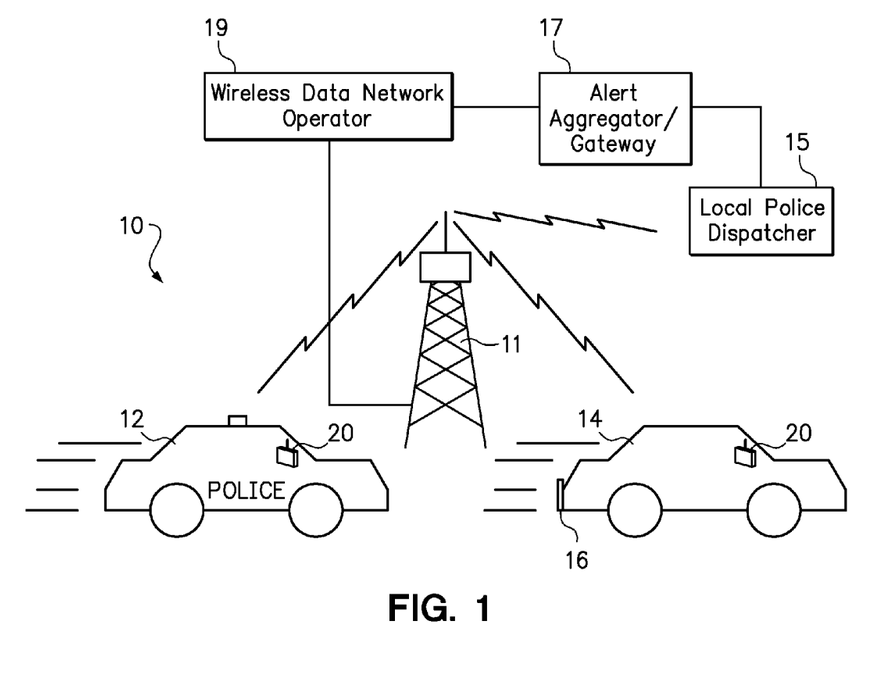
FIG. 1 is a diagram of a system in which embodiments of the present invention may be performed.

FIG. 1 is a diagram of a system 10 including a first mobile communication device 20 and a second mobile communication device 20 in communication over a communication network. The first and second communication devices 20 may be identical, but are not required to be identical. In accordance with one non-limiting embodiment, the first mobile communication device 20 is positioned or installed in a police car 12, and the second mobile communication device 20 is positioned or installed in another vehicle 14, referred to herein as a "target vehicle" since it is the target of a message. In one scenario in which the present invention may be beneficial, the police car 12 is following the target vehicle 14 and wants the target vehicle to stop, but does not have telephone number for the driver of the target vehicle. Rather, the first mobile communication device 20 can visually observe and read a license plate identifier printed on a license plate 16 secured to the target vehicle 14.

Personnel in the police car 20 may enter the license plate identifier into the first mobile communication device 20 and then send a wireless message containing the license plate identifier to a local police dispatcher 15 via the telecommunications tower 11. In this illustration, the police dispatcher 15 may prepare and send a message, including any necessary authorization data, to an alert aggregator and gateway 17 that provides a secure interface to the wireless data network operator 19. The wireless data network operator 19 may then cause the message containing the license plate identifier to be broadcast to all mobile communication devices within a geographically specific area, such as the broadcast range of the same telecommunications tower 11 that received the original message from the first mobile communication device 20 in the police car 12. However, only the second mobile communication device 20 in the target vehicle 14, which is configured with the same license plate identifier that is displayed on the license plate 16, will receive and display the message for the user of the second mobile communication device 20. The system 10 may be used to carry out steps of other embodiments of the present invention.

Figure 2:
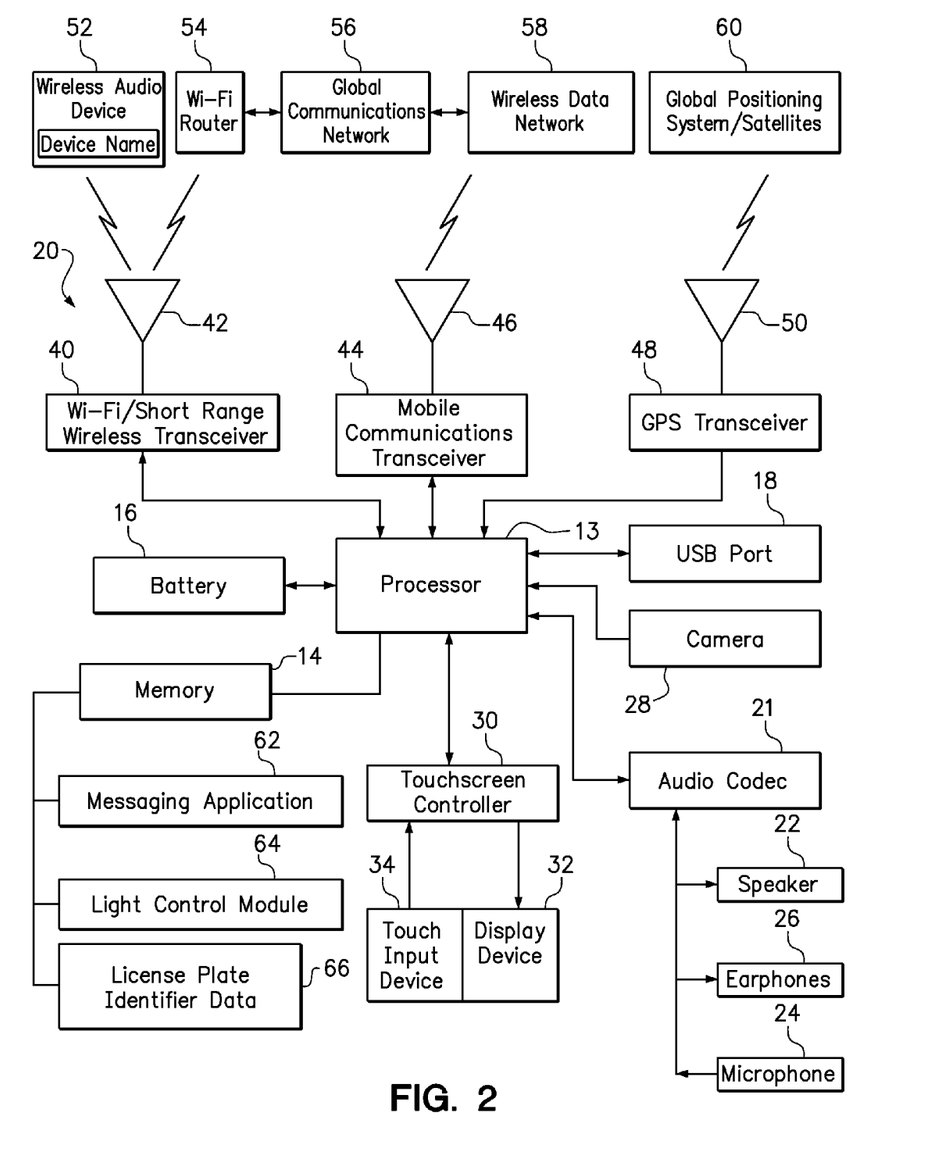
FIG. 2 is a diagram of a mobile communication device suitable for use in one or more embodiments of the present invention.

FIG. 2 is a diagram of the mobile communication device 20, such as a smart phone or tablet computer, capable of implementing embodiments of the present invention. The mobile communication device 20 may be representative of either or both of the first and second mobile communication devices shown in FIG. 1.

The computing device 20 may include a processor 13, memory 14, a battery 16, a universal serial bus (USB) port 18, a camera 28, and an audio codec 21 coupled to a speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The computing device 20 may also include a Wi-Fi and/or Bluetooth transceiver 40 and corresponding antenna 42 allowing the device to communicate with a wireless (Bluetooth) audio device 52 or a Wi-Fi router 54, a mobile communication transceiver 44 and corresponding antenna 46 allowing the device to communicate over a wireless data network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. In order to implement one or more embodiment of the present invention, the memory 14 may store a messaging application 62, a light control module 64, and license plate identifier data 66.

Figure 3:
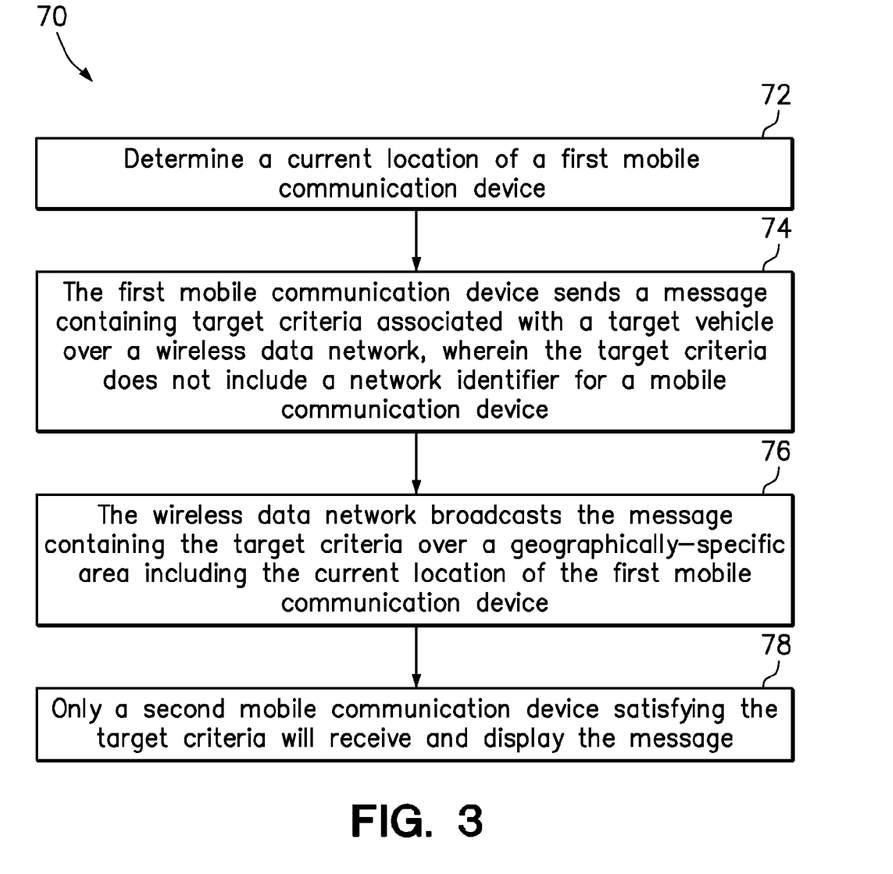
FIG. 3 is a flowchart of a method according to one embodiment of the present invention.

FIG. 3 is a flowchart of a method 70 according to one embodiment of the present invention. In step 72, the method determines a current location of a first mobile communication device. In step 74, the first mobile communication device sends a message containing target criteria associated with a target vehicle over a wireless data network, wherein the target criteria does not include a network identifier for a mobile communication device associated with the target vehicle. In step 76, the wireless data network broadcasts the message containing the target criteria over a geographically-specific area including the current location of the first mobile communication device. Then, in step 78, only a second mobile communication device satisfying the target criteria receives and displays the message.

Figure 4:
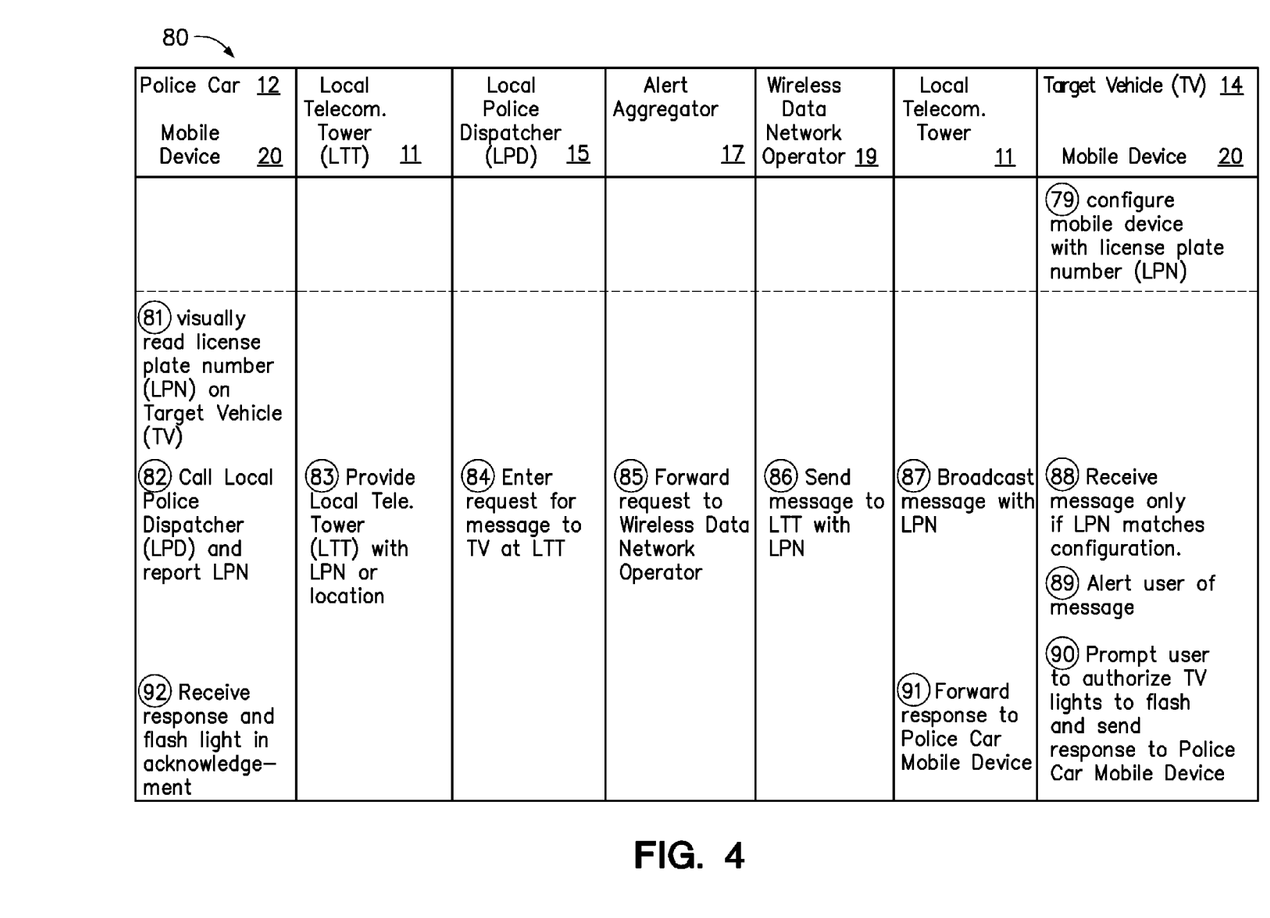
FIG. 4 is a chart of a method according to another embodiment of the present invention.

FIG. 4 is a chart illustrating a method 80 according to another embodiment of the present invention. Along the top of the chart, there are several column headers that each identify one of the elements of the system 10 of FIG. 1. Specifically, these column headers include, from left to right, the police car 12 mobile communication device 20, local telecommunications tower 11, local police dispatcher (LPD) 15, alert aggregator 17, wireless data network operator 19, local telecommunications tower 11, and target vehicle 14 mobile communication device 20. The two columns labeled "local telecom. tower 11" may be the same tower or two different towers. Within the chart, the steps are described under one of the columns that corresponds to the element of the system 10 that performs the respective step.

Step 79 is considered a setup step, in which the target vehicle 14 mobile device 20 ("second mobile communication device") is configured with the license plate number (LPN) of the target vehicle 14. In step 81, the license plate number (LPN) on the target vehicle (TV) 14 is visually read by personnel in the police car 12. In step 82, the personnel enter the license plate number into the police car 12 mobile device 20 and send a message, such as a call or a text message, to the local police dispatcher (LPD) to provide the license plate number and a message. In step 83, the local telecommunication tower 11, that has received the wireless message from the first mobile communication device 20 associated with the police car 12, provides a local telecommunication tower (LTT) identification (ID) or location as an indication of the current location of the police car 12. In step 84, the local police dispatcher 15 enters a request for a message to be broadcast to the target vehicle (TV) 14, such as from the local telecommunication tower (LCT) 11. In step 85, the alert aggregator receives and forwards the request to the wireless data network operator 19. In step 86, the wireless data network operator 19 sends the message, including the license plate number (LPN), to the same or a different local telecommunication tower (LTT) 11 where the second mobile communication device 20 of the target vehicle 14 is located. Accordingly, in step 87, the local telecommunication tower (LTT) 11 broadcasts the message along with the license plate number. In step 88, the target vehicle 14 mobile communication device 20 will receive the message/request only if the license plate number (LPN) in the message matches the license plate number (LPN) that has been configured into the second mobile communication device 20 of the target vehicle 14. In step 89, second mobile communication device 20 of the target vehicle 14 will alert or display the message to a user and, in step 90, prompt the user to authorize the target vehicle's lights to flash and the device to send a response to the police car 12. In step 91, the local telecommunication tower 11 forwards the response to the mobile communication device 20 of the police car 12. In step 92, the mobile communication device 20 of the police car 12 receives the response and may cause external lights of the police car 12 to flash in acknowledgement.

Beneficially, the driver of the target vehicle can be reassured that the following car is an official police vehicle, since only a valid police entity can cause the broadcast system to send such a message, and only a valid police entity will flash its lights upon receipt of a response message. Furthermore, the personnel in the police vehicle can see that the target vehicle has received the message, such as a request to stop the target vehicle, by observing the flashing external lights of the target vehicle.

Figure 5:
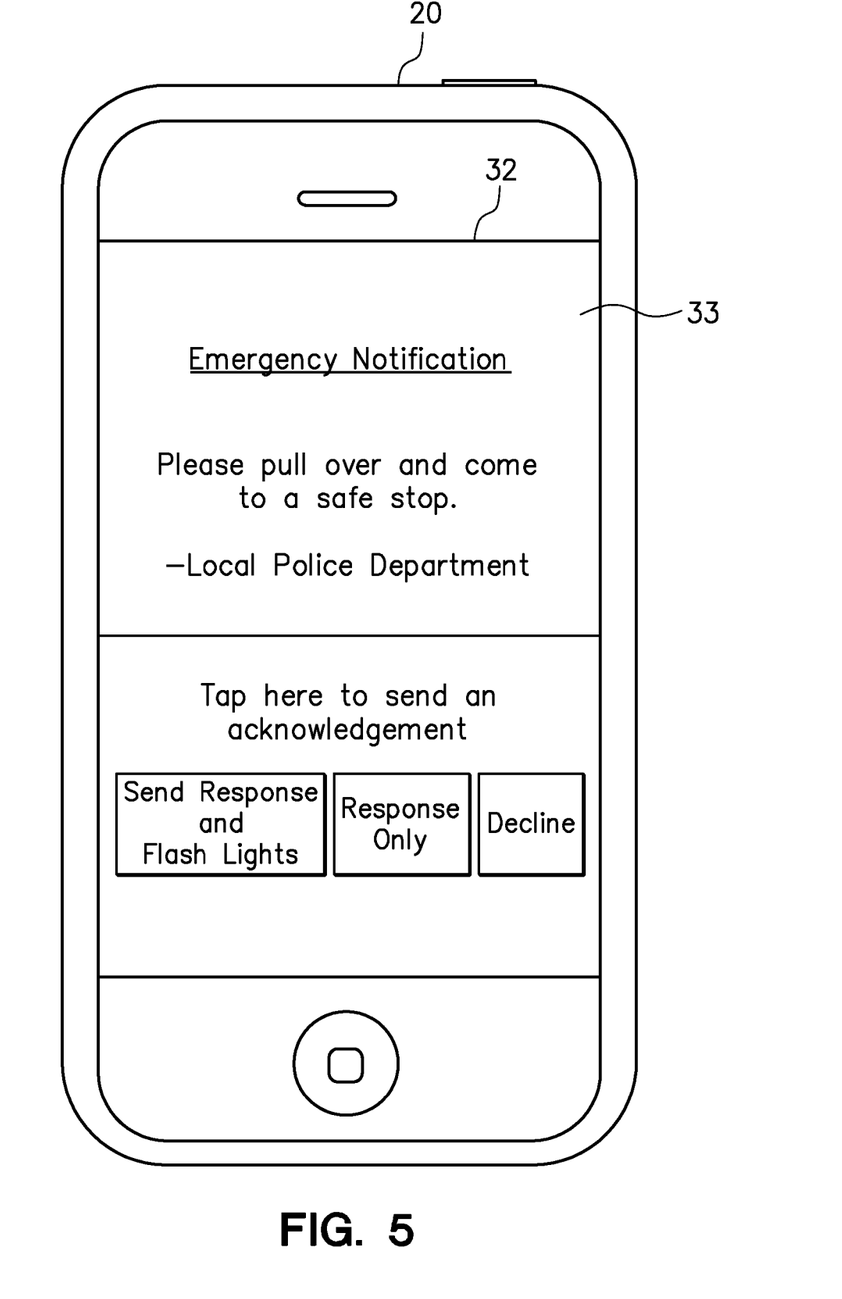
FIG. 5 is a diagram of a display screen of a mobile communication device illustrating an on-screen notification.

FIG. 5 is a diagram of a display screen 32 of a mobile communication device 20 illustrating one non-limiting example of an on-screen notification 33. This Emergency Notification example displays a message saying "Please pull over and come to a safe stop.—Local Police Department". In addition, the display prompts the user to "Tap here to send an acknowledgment", and provides three options including "send response and flash lights", "response only", and "decline".

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on a non-transitory computer readable medium that can direct a computer, other programmable data processing apparatus, or other devices to function in a particular manner, such that the instructions stored on the non-transitory computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a communication device installed in a vehicle;
the communication device configured to receive a wireless network broadcast message including target criteria other than a network identifier, and output the broadcast message to a user if the communication device satisfies the target criteria in the broadcast message;
wherein the target criteria includes a target location and a speed value, and wherein the communication device satisfies the target criteria and outputs the broadcast message in response to determining that the communication device is located within a predetermined distance of the target location and that the communication device is moving at a speed within a predetermined amount of the speed value.

2. The system of claim 1, wherein the communication device outputs the broadcast message to an output device selected from a display, speaker, and combination thereof.

3. A method, comprising:
   determining a current location of a first communication device;
   the first communication device sending a message containing target criteria associated with a target vehicle over a wireless data network, wherein the target criteria includes the current location of the first communication device and a speed value, but does not include a network identifier for a mobile communication device; and
   the wireless data network broadcasting the message containing the target criteria over a geographically-specific area including the current location of the first communication device, wherein only a second mobile communication device satisfying the target criteria will receive and display the message, and wherein the second mobile communication device satisfies the target criteria and displays the message in response to determining that the second mobile communication device is within a predetermined proximity to the current location of the first communication device and has a speed within a predetermined amount of the speed value.

4. The method of claim 3, wherein the second mobile communication device displays the message as a text message.

5. The method of claim 3, wherein the current location of the first communication device is determined by the first communication device, the method further comprising:
   the first communication device transmitting the current location to the wireless data network.

6. The method of claim 3, wherein the first communication device is a mobile communication device installed in an emergency vehicle, wherein the second mobile communication device is located within the target vehicle.

7. The method of claim 6, wherein the first mobile communication device is authorized by the wireless data network to send the message as an emergency notification.

8. The method of claim 7, wherein the second mobile communication device displays the emergency notification.

9. The method of claim 3, further comprising:
   a telecommunication tower in the wireless data network receiving the message from the first mobile communication device, wherein the geographically-specific area is the broadcast area of the telecommunication tower.

10. The method of claim 7, wherein the message is sent through a wireless emergency alert system that uses the wireless data network for broadcasting messages to an unrestricted number of mobile communication devices.

11. The method of claim 10, further comprising:
    the wireless data network broadcasting the message only if the message is received from a device authorized by the wireless data network; and
    the first mobile communication device sending the message along with authorization data.

12. The method of claim 3, further comprising:
    the second mobile communication device automatically causing the target vehicle to flash lights in a predetermined pattern in response to receiving the message.

13. The method of claim 12, wherein the second mobile communication device automatically causing the target vehicle to flash external lights includes the second mobile communication device transmitting an instruction to the target vehicle via a point-to-point wireless communication.

* * * * *